US006608718B1

(12) United States Patent
Burton

(10) Patent No.: US 6,608,718 B1
(45) Date of Patent: Aug. 19, 2003

(54) METHOD AND SYSTEM FOR CREATING FALSE THREE-DIMENSIONAL IMAGES FOR AMUSEMENT

(75) Inventor: John Burton, Bentan, AR (US)

(73) Assignee: Nightmare Network, Inc., Louisville, KY (US)

( * ) Notice: Subject to any disclaimer, the term of this patent is extended or adjusted under 35 U.S.C. 154(b) by 0 days.

(21) Appl. No.: 09/149,616

(22) Filed: Sep. 8, 1998

Related U.S. Application Data

(60) Provisional application No. 60/058,374, filed on Sep. 9, 1997.

(51) Int. Cl.7 .......................... G02B 27/22; A36G 31/00
(52) U.S. Cl. ..................... 359/462; 359/466; 359/477; 472/61
(58) Field of Search ................... 359/464, 462, 359/478, 466, 471, 472, 475, 477; 472/61

(56) References Cited

U.S. PATENT DOCUMENTS

| | | | |
|---|---|---|---|
| 2,865,988 A | 12/1958 | Cafarelli, Jr. ............... | 348/144 |
| 4,021,846 A | 5/1977 | Roese ......................... | 359/465 |
| 4,597,634 A | 7/1986 | Steenblik .................... | 359/464 |
| 4,717,239 A | 1/1988 | Steenblik .................... | 359/464 |
| 5,002,364 A | 3/1991 | Steenblik .................... | 359/462 |
| 5,469,295 A * | 11/1995 | Burke ......................... | 359/478 |
| 5,482,510 A * | 1/1996 | Ishii et al. .................... | 472/61 |

* cited by examiner

*Primary Examiner*—Audrey Chang
(74) *Attorney, Agent, or Firm*—Stites & Harbison, PLLC; David W. Nagle, Jr.; Vance A. Smith

(57) ABSTRACT

A method and system for producing false three-dimensional images for amusement may be used in haunted houses, fun houses, or similar attractions found at fairs, amusement parks, and/or tourist areas. The method includes forming specific color and geometric patterns on a substantially black background illuminated by ultraviolet light and then viewing the resultant images through the preferred stereoscopic lenses.

2 Claims, 3 Drawing Sheets

METHOD AND SYSTEM FOR CREATING FALSE THREE-DIMENSIONAL IMAGES FOR AMUSEMENT

This application claims priority from U.S. provisional application 60/058,374, filed Sep. 9, 1997.

BACKGROUND OF THE INVENTION

The present invention relates to the creation of false three-dimensional images in an amusement center, such as a haunted house. A viewer passing through an amusement center employing the method and system of the present invention is provided with stereoscopic glasses which alter the perceived depth of objects in three-dimensional space. The viewer is thus presented with a variety of three-dimensional illusions that are enhanced by certain combinations of lighting, fluorescing surfaces, and theatrical presentation and staging.

The use of stereoscopic lenses to alter the perceived depth of objects based on their wavelength (color) is well-known in the art. Such lenses are described in U.S. Pat. No. 4,597,634; 4,717,239; and 5,002,364 issued to Steenblik. Each of these patents is incorporated herein by reference.

A stereoscopic lens is essentially a single or double prism. As described in the Steenblik references, when an image is viewed through a single prism, blue light emanating from the image passes through the prism and is bent through at a sharper angle than red light emanating from the same image. The eyes must then turn more inward to see the blue portion of the image as compared to the red portion, even though the images are actually in the same plane in three-dimensional space. The brain interprets, by parallax, the blue portion of the image as being closer to the viewer, and the red portion of the image as being more distant, provided that the parallax is not greatly overridden by or contradicted by other visual cues such as relative size, composition, and perspective. Of course, these optics can be reversed so that blue images appear more distant, and red images appear closer to the viewer, as described in the Steenblik references.

Single prisms, however, can cause visual disorientation and eye strain (because the eyes are being focused at a distance which is different from the focal point the brain expects based on the parallax of the eyes). Therefore, a double prism lens is often preferred. A double prism arrangement, as described in the Steenblik references, effectively pushes the image distance back to coincide with the actual object distance, thereby making the point in space upon which the eyes focus coincide with the point they expect to focus on. This pushing of the image back to the object distance allows the image to move as the brain expects it to. Such a double prism arrangement can be easily and inexpensively incorporated into lightweight plastic glasses, such as those distributed by Chromatek, Inc. of Marietta, Georgia. The Chromatek glasses employ a double prism arrangement that results in red images appearing nearest to the viewer and blue images appearing most distant from the viewer. These glasses are the preferred stereoscopic lenses employed in the method and system of the present invention.

Although the described lenses are needed to view the three-dimensional illusions, environmental factors, such as, for example, color arrangements, lighting, and relative object size, can vastly enhance the illusions created. It is thus an object of the present invention to provide a method of creating, in an amusement center, false three-dimensional images viewable through the described lenses by forming specific patterns that enhance the three-dimensional effect.

It is a further object of the present invention to provide a method of creating false three-dimensional images that employs specific lighting techniques that enhance the three-dimensional effect.

These and other objects will become readily apparent upon a reading of the description herein with the appended drawings.

SUMMARY OF THE INVENTION

The present invention is a method and system for producing false three-dimensional images for amusement. Particularly, the method described herein may be used in haunted houses, fun houses, or similar attractions found at fairs, amusement parks, and/or tourist areas. The method includes forming specific color and geometric patterns on a substantially black background illuminated by ultraviolet light and then viewing the resultant images through the preferred stereoscopic lenses.

DESCRIPTION OF THE PREFERRED EMBODIMENTS

Figure 1:
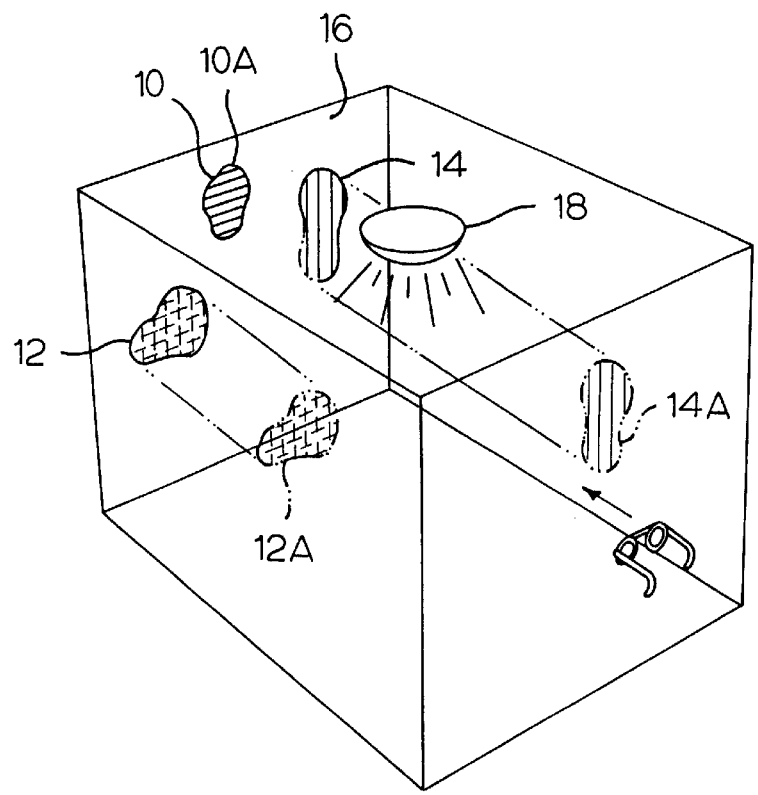
FIG. 1 is a perspective view of a simple color pattern wherein the red image appears closer to the viewer than the yellow image, and the yellow image appears closer to the viewer than the blue image, when the pattern is viewed through the preferred stereoscopic lenses.
Figure 2:
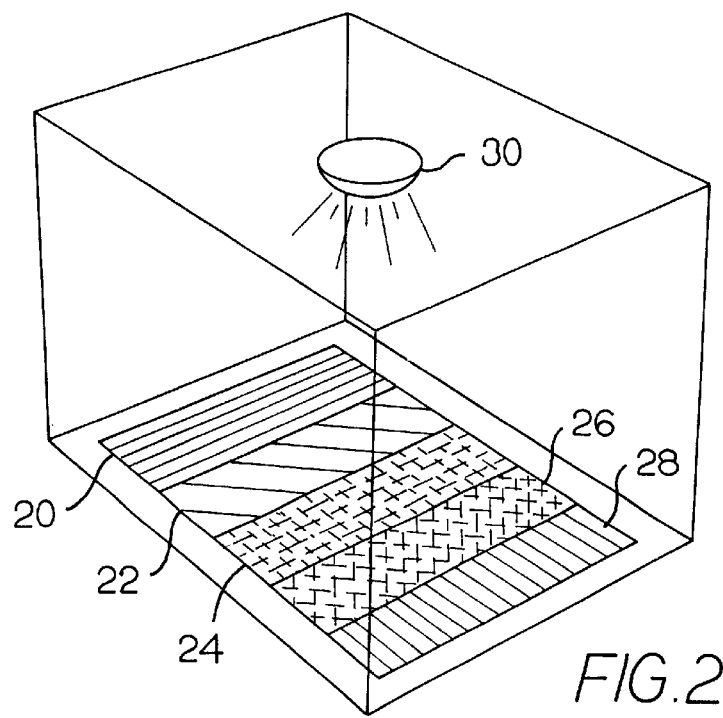
FIG. 2 is a view of a particular pattern wherein the colored rectangles are arranged in a sequential abutting relationship to provide the viewer with the illusion of ascending steps when the pattern is viewed through the preferred stereoscopic lenses.
Figure 4:
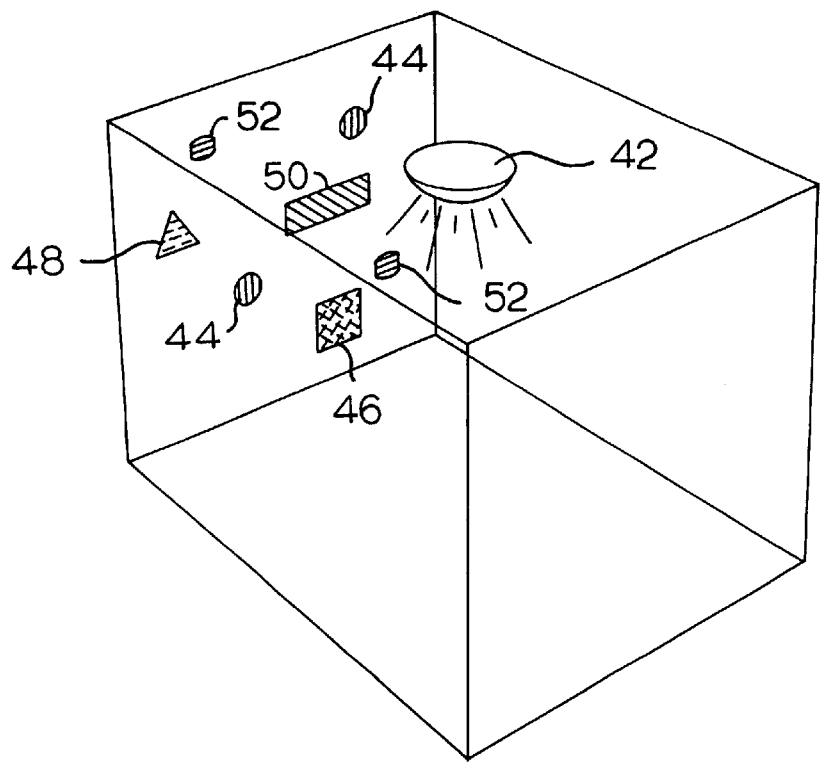
FIG. 4 is a view of a pattern of various shapes having varying colors wherein the viewer is provided with an illusion of random objects floating in three-dimensional space when the pattern is viewed through the preferred stereoscopic lenses.

The present invention provides a method for altering the depth perception of an individual viewer so as to provide a false three-dimensional illusion of a planar object, or alternatively, to enhance or distort the perception the viewer has of a three-dimensional object. FIGS. 1–2 and 4, along with the discussion related thereto, provide examples of generating a perceived three-dimensional image from objects that are actually contained within a single plane. Referring first to FIG. 1, a trio of flat objects 10, 12, 14 are painted or otherwise placed in a coplanar relationship on a rear wall 16 of a room within an amusement center. As shown in FIG. 1, these objects 10, 12, 14 are respectively colored blue, yellow, and red. When viewed through stereoscopic lenses that selectively diffract light based on its wavelength (preferably the aforementioned lenses manufactured by Chromatek, Inc. of Marietta, Georgia), while the image 10A of the blue object still appears to be at the surface of the rear wall 16, the yellow image 12A appears in three-dimensional space some distance from the wall 16, and the red image 14A appears to be even further from the wall 16 and closer to the viewer. It is important to note that blue light has a wavelength of approximately 4750 Å. With the preferred glasses, however, only visible light having a wavelength of greater than approximately 5000 Å appears to project away from the surface of the wall. This is why the blue image 10A still appears to be at the surface of the rear wall 16. With wavelengths greater than 5000 Å, the greater the wavelength, the more pronounced the perceived distance between the image and the wall. In this example, the red light appears nearest the viewer as it has a wavelength of approximately 6750 Å whereas the yellow light has a wavelength of approximately 5750 Å.

As stated above, the preferred stereoscopic lenses cause the light to pass through a prism which diffracts the various colors at different angles. The preferred lenses diffract the red light to a greater degree than the yellow or red light, and thus causing the eyes to turn more inward to see the red light. Without any other visual cues, the red image is perceived by a viewer to be closer than images of other colors. A more detailed discussion of the stereoscopic phenomenon described and the specific double prism structure of the preferred lenses is contained within U.S. Pat. Nos. 4,597,634; 4,717,239; and 5,002,364 (issued to Steenblik), each of which has been incorporated herein by reference.

To enhance the perceived three-dimensional illusion, it is preferred that each room displaying images have floors and walls that are painted substantially black. This provides an optimal background for viewing of the false three-dimensional images. The black surfaces create a reference from which the relative depth of each of the perceived images is measured. To further accentuate the three-dimensional illusion, it is also preferred that the colored objects (for example objects 10, 12, and 14 in FIG. 1) are painted with materials having fluorescent qualities when viewed under ultraviolet light, said light being indicated by reference numeral 18 in FIG. 1. This light, commonly known as black light, has a wavelength less than approximately $4.3 \times 10^{-7}$ meters, or 4300 Å. When the colored objects are positioned on a black background and illuminated by the ultraviolet light, the light has the effect of greatly enhancing the three-dimensional illusion perceived by the viewer. Each object is sharply distinguished from the black background, creating the illusion of a free-floating object. The combination of the substantially black background, fluorescent objects, and ultraviolet thus creates an illusion of free-floating objects, a highly desirable feature because of the entertainment value of such illusions.

Although not shown in the Figures, as a further refinement, the geometry of the colored images may be manipulated to maximize the three-dimensional effect. As mentioned, other visual cues can overcome the effect of parallax, and relative size can be an important factor in a viewer's perception of depth. For example, if a series of colored balls are painted on the black background, the distant blue ball should be the largest diameter ball. The nearest red ball should have the smallest diameter. This geometric deviation of the size of the balls further fools a viewer into perceiving depth.

The following are various illustrations of the use of the method and system of the present invention.

Figure 2A:
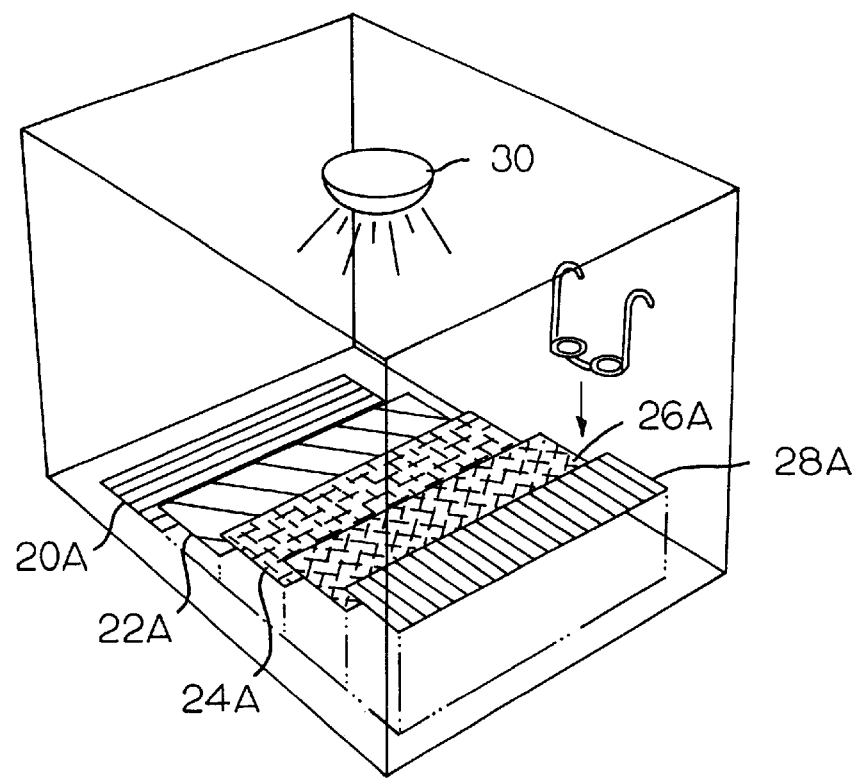
FIG. 2A is a view of the pattern of FIG. 2, showing the viewer's perception of the position of the colored rectangles in three-dimensional space when the pattern is viewed through the preferred stereoscopic lenses.

FIG. 2 illustrates another illusion in which a viewer interprets the false image to represent a common object that requires physical navigation, in this case, a staircase. As shown, a series of abutting rectangles is painted on the floor of the amusement center in ascending order from the most distant color, blue, to the nearest color, red. In this example, there is a blue rectangle 20, a green rectangle 22, a yellow rectangle 24, an orange rectangle 26, and a red rectangle 28. These rectangles are preferably created on the floor of the room using fluorescent pigments. Also, it is preferred that the only light source be an ultraviolet light positioned within the room, as indicated by reference numeral 30. Referring now to FIG. 2A, when viewing these rectangles through the preferred stereoscopic lenses described above, an illusion of ascending steps is created, as shown in FIG. 2A. The blue step 20A still appears to be in the plane of the floor, but the successive steps (green 22A, yellow 24A, orange 26A, and red 28A) appear in three-dimensional space progressively nearer to the viewer. The viewer, when approaching the "steps" of the "staircase" to attempt to negotiate the steps in accordance with his perception, is thus surprised to discover that all of the steps are actually in the same plane.

Figure 3:
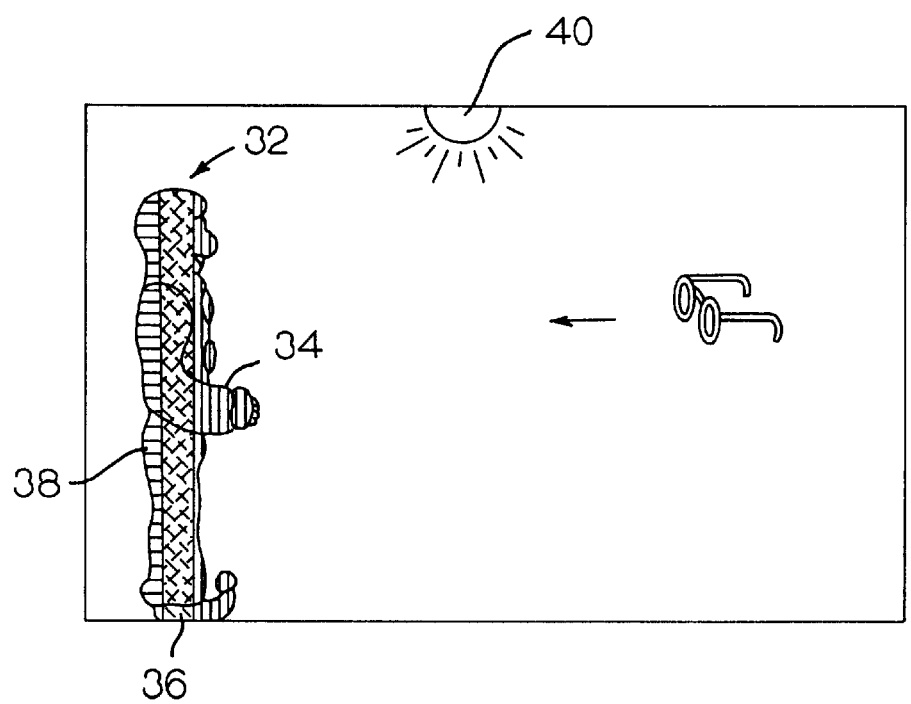
FIG. 3 is a side view indicating how a three-dimensional object may be color-coded to exaggerate the perceived depth of the object when the object is viewed through the preferred stereoscopic lenses.

FIG. 3 demonstrates how the perceived depth of a three-dimensional object can be accentuated or distorted employing the system and method of the present invention. As shown in FIG. 3, a three-dimensional object 32 (in this example, a clown figure) is positioned within a dark room in an amusement center. Selected front portions 34 of the object 32 are painted red so that, when viewed through the preferred stereoscopic lenses, these portions 34 will appear nearest to the viewer. Similarly, other selected potions may be painted with other colors that will cause these portions to appear at various positions in three-dimensional space when viewed through the preferred stereoscopic lenses. In this example, as shown in FIG. 3, the object 32 has intermediate portions 36 that are painted yellow and rear portions 38 that are painted blue. As described above, to accentuate the three-dimensional illusion, it is preferred that fluorescent colors are used and that the object 32 be illuminated solely by ultraviolet light 40. The effect is that as a viewer perceives exaggerated depth, that is, portions of the object seemingly project toward the viewer. For example, if only the eyes of the clown 32 shown in FIG. 3 were to be painted red, the eyes would stand out and seemingly float in three-dimensional space in front of the clown 32 when the clown 32 is viewed through the preferred stereoscopic lenses.

Figure 4A:
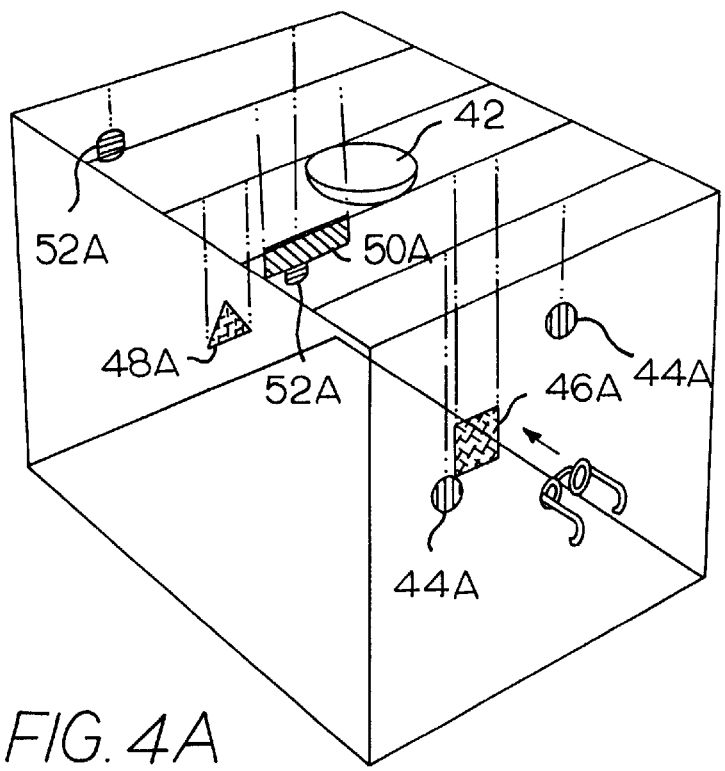
FIG. 4A is a view of the pattern of FIG. 4, showing the viewer's perception of the position of the colored shapes in three-dimensional space when said pattern is viewed through the preferred stereoscopic lenses.

FIG. 4 shows a simple pattern of various colored shapes painted on the wall of, a room within the amusement center. In this example, there are two red circles 44, an orange square 46, a yellow triangle 48, a green rectangle 50, and two blue objects 52. Again, the room is substantially dark with the sole light source being an overhead ultraviolet light 42. When viewed through the preferred stereoscopic lenses as shows in FIG. 4A, the individual shapes appear to be at various positions in three-dimensional space within the room, the perceived depth of each shape being a result of its color. For example, the red circles 44A appear nearest the viewer whereas the blue objects 52A still seem to be in the plane of the wall on which they are painted. The orange square 46A, yellow triangle 48A, and green rectangle 50A appear somewhere between the red circles 44A and blue objects 52A in three-dimensional space.

Although not shown in the drawings, in another application of the method and system of the present invention, colored paints are splattered on the walls and floor of the amusement center. When viewed through the preferred stereoscopic lenses, this creates an illusion of multiple layers of the walls or floor. For example, if a viewer looks through the lenses at his feet, it appears that he is standing between the false layers of the floor.

The above illustrations are mean to be instructive, and by no means describe all potential applications of the method and system of the present invention. It is understood that applications other than those described above are within the spirit and scope of the present invention as set forth herein and in the appended claims.

What is claimed is:

1. A method of creating false images in an area of an amusement center in which individuals wearing stereoscopic lenses that selectively diffract light based on its wavelength travel through various rooms and hallways having various patterns displayed on the surfaces thereof, comprising the steps of:

forming one of said various patterns in two or more sets of colors within said area on a substantially black background that reflects substantially no electromagnetic radiation, a first set being comprised of a first color reflecting light having a first wavelength, and a second set being comprised of a second color reflecting light of a second wavelength, wherein said second wavelength is greater than said first wavelength; and illuminating said pattern with an ultraviolet light source having a wavelength less than approximately 4300 Å, whereby, to an individual viewing said pattern through said stereoscopic lenses, said second set appears closer than said first set;

wherein a surface of said area has at least one three-dimensional structure secured to and extending therefrom, one of said various patterns being formed on said structure with said first set being positioned on a portion of the structure closest to said surface, and said second set being positioned on a portion of the structure extending further away from said surface, thereby exaggerating the depth of the three-dimensional object when viewed through said lenses.

2. A system for creating three-dimensional images in an amusement house setting, comprising:

at least one room sealed from outside sources of electromagnetic radiation, said room having surfaces that are substantially black and reflect substantially no electromagnetic radiation;

at least one source of light positioned within said room and irradiating at least a predetermined area of said surfaces with electromagnetic radiation having a wavelength of less than about 4300 Å;

a display positioned in said predetermined area, said display being comprised of a plurality of distinct layers of color positioned on a surface of said room with each layer reflecting electromagnetic radiation of a different wavelength, said layers being arranged in a predetermined pattern; and optical viewing glasses for viewing said display irradiated by said source, said glasses having lenses that provide preferential diffraction characteristics so that visible electromagnetic radiation having shorter wavelengths reflected from one of said layers is diffracted to a lesser extent than visible electromagnetic radiation having longer wavelengths reflected from another of said layers, thereby providing a wearer of said glasses an image of said display where said layer of shorter wavelengths appears more distant than said layer with longer wavelengths, thus giving a three-dimensional appearance to said image;

in which said display further comprises a three-dimensional structure secured to and extending therefrom, said one layer placed on a first portion of said structure, and said second layer placed on a second portion of said structure, said first portion being farther from a point in the room occupied by the wearer of the glasses than said second portion, thereby providing the image of said structure with exaggerated depth.

* * * * *